United States Patent [19]
Butcher et al.

[11] Patent Number: 5,749,686
[45] Date of Patent: May 12, 1998

[54] PIVOTABLE SIDEWALL MOUNTED CONTAINER STOP FOR RAILCAR WELL

[75] Inventors: Ronald S. Butcher; Ilario A. Coslovi, both of Burlington, Canada

[73] Assignee: National Steel Car Ltd., Ontario, Canada

[21] Appl. No.: 641,377

[22] Filed: Apr. 30, 1996

[51] Int. Cl.⁶ .......................... B60P 7/135; B61D 45/00
[52] U.S. Cl. .......................... 410/94; 410/72; 410/121
[58] Field of Search .......................... 410/71, 72, 73, 410/94, 95, 109, 121; 248/354.6, 351; 105/355; 114/75

[56] References Cited

U.S. PATENT DOCUMENTS

| | | | |
|---|---|---|---|
| 2,114,707 | 4/1938 | Fitch et al. | 410/94 |
| 4,826,371 | 5/1989 | Brown | 410/72 X |
| 5,000,633 | 3/1991 | Kowalik et al. | 410/94 X |
| 5,017,066 | 5/1991 | Tylisz et al. | 410/121 |
| 5,106,247 | 4/1992 | Hove et al. | 410/73 |

FOREIGN PATENT DOCUMENTS 719883  10/1965  Canada ........................... 410/71

*Primary Examiner*—Stephen Gordon
*Attorney, Agent, or Firm*—Oldham & Oldham Co., L.P.A.

[57] ABSTRACT

A sidewall mounted, pivotable container stop mechanism for use with railcars or other types of transportation vessels having a cargo hold. The mechanism includes an elongate stop member pivotable between a retracted position, wherein the stop member is stored externally of the cargo hold, and an extended position, wherein the stop member extends into the cargo hold through an opening in the cargo hold sidewall. In its extended position, the stop member is positioned adjacent to a container that is placed in the cargo hold thereby preventing displacement of the container during transit. The mechanism includes a latch mechanism for releasably locking the elongate stop member in the stored position. A mechanism is also provided for maintaining the elongate member in the extended position.

14 Claims, 5 Drawing Sheets

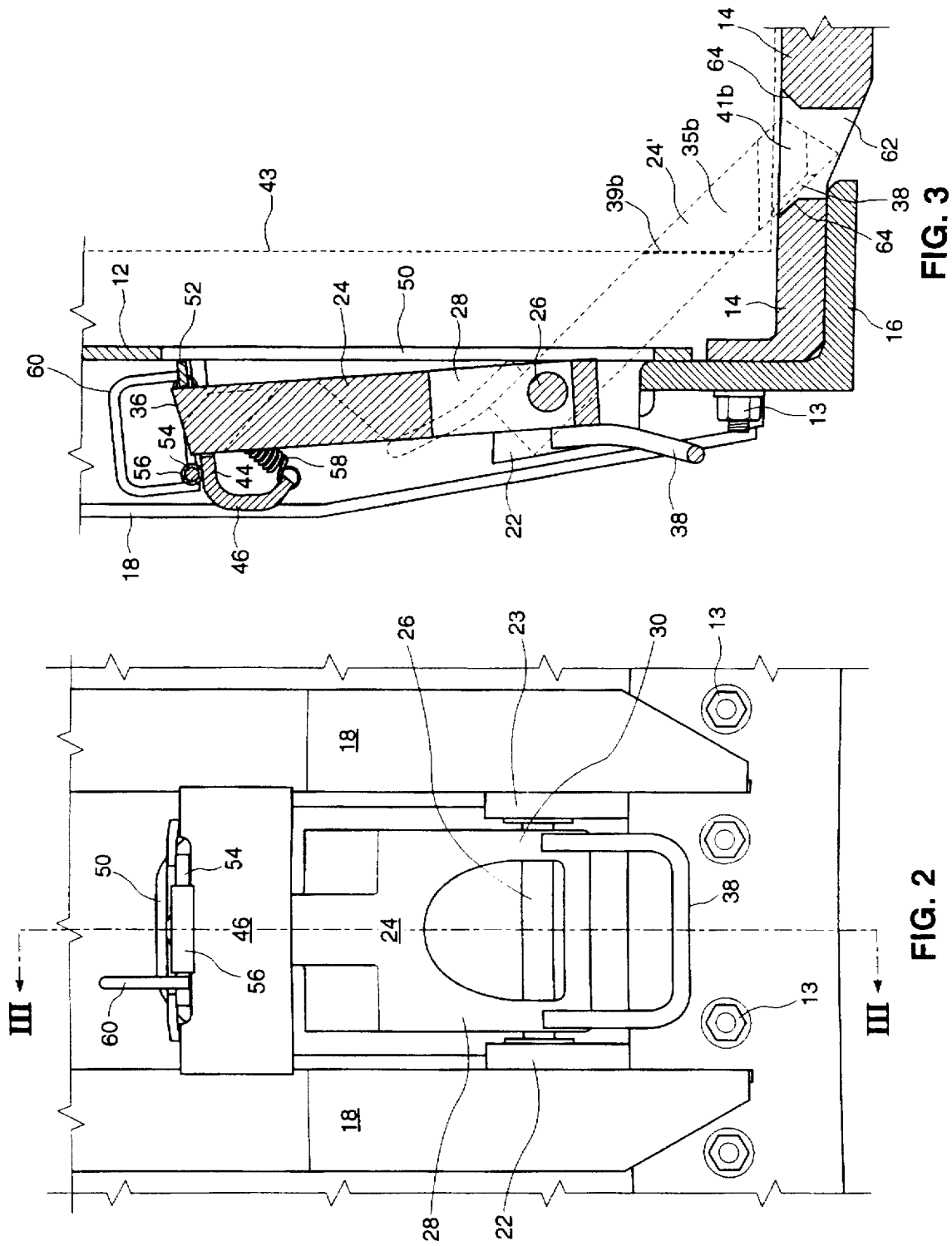

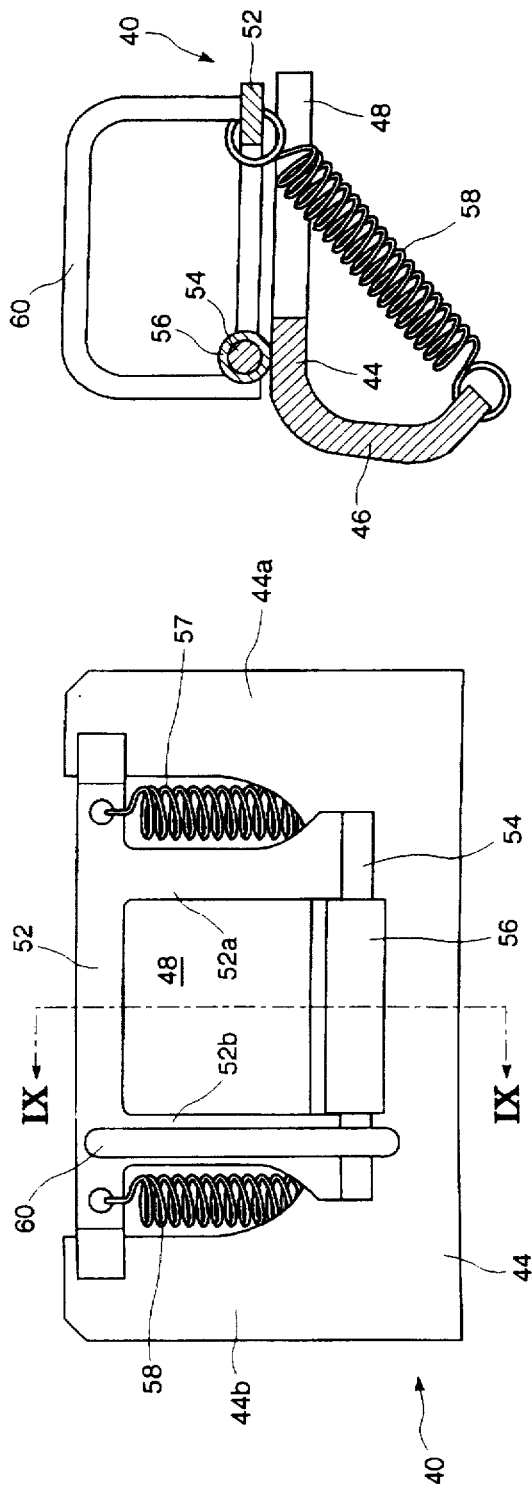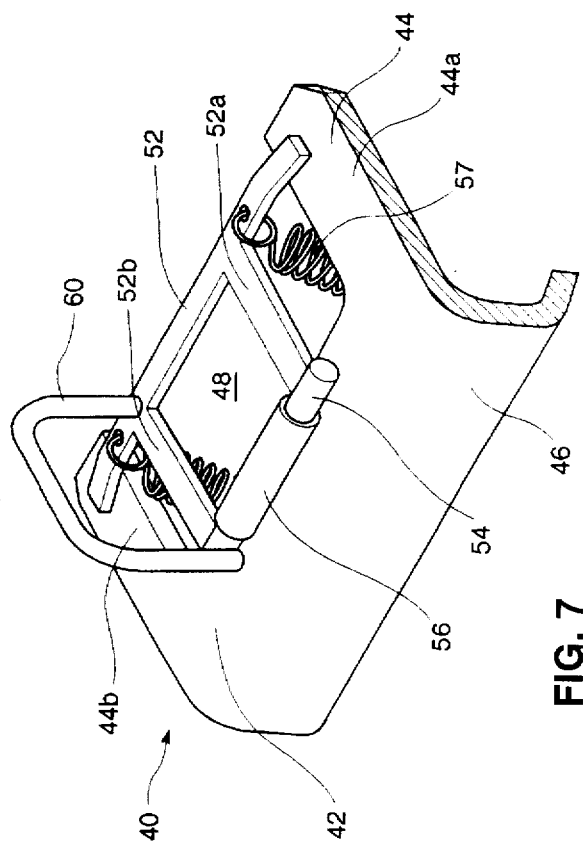

5,749,686

1

PIVOTABLE SIDEWALL MOUNTED CONTAINER STOP FOR RAILCAR WELL

FIELD OF THE INVENTION

This invention relates to the field of cargo retainers or fasteners, and more particularly to apparatus for preventing large containers from being displaced during transit.

BACKGROUND OF THE INVENTION

When shipping goods from one geographical location to another, whether by rail, truck or other type of transportation vehicle, it has become customary to employ large, standardized intermodal containers, which are typically available in 20, 40, 45, 48 or 53 foot lengths, as receptacles for a wide variety of goods and materials being shipped. The standardization of such containers, particularly in the rail industry, provides a number of benefits including the re-usability of the containers among a variety of the railway's patrons, the use of standard machinery and procedures for the efficient handling, loading and unloading of cargo, and for enabling the optimal storage and stacking of cargo containers within the limited confines of a railcar.

One of the problems experienced during shipping is the displacement or shifting of the container from an initial location in the vehicle when one or more containers are first loaded therein to some other position due to the inertial or dynamic forces acting on the containers during transit. Rail cars, in particular, typically have floors which are composed of trusses. Certain truss members are designed to bear vertical loads, but other truss members are installed to resist lateral loads and for container breakout protection, i.e., for preventing the contents of the container, in case the container breaks, from falling to the rails below and possibly causing a derailment. Should the containers shift from their initial position on the vertical load bearing truss members onto diagonal truss members or supplemental breakout protection members, these latter members, which are not designed to withstand significant vertical forces, can become damaged or possibly break and allow the container to fall to the rails below.

It is, of course, possible to tie down the container in a rail car or other transportation vessel by means of cabling or the like in order to prevent the container from shifting during transit. However, it will be necessary to eventually untie the container which can require a considerable amount of time and therefore be wasteful of human resources. It is also possible to use various types of hooks and clasps to fasten the container against a rail car wall. However, it is still necessary to eventually unhook the container. Moreover, it is unlikely that all containers will have the necessary structural attachment elements such as hooking rings for fastening the container.

The present invention seeks to provide a mechanism for preventing the displacement or shifting of containers in a transportation vehicle which can be employed with many standardized containers without modification thereto. Moreover, the invention seeks to provide a mechanism which can be quickly and easily employed.

SUMMARY OF THE INVENTION

Broadly speaking, the invention provides a stop mechanism having an elongate stop member which is pivotally mounted at one end thereof to a wall of the transportation vehicle. In a stored or retracted position, the elongate stop member is disposed generally parallel to the vehicle wall but the member can be actuated to transversely extend or project out from the vehicle wall towards the interior of the vehicle and be maintained in that position. In this manner, the elongate stop member effectively compartmentalizes the interior space of the transportation vehicle and prevents any container from shifting or moving past the elongate member.

According to one aspect of the invention, there is provided a mechanism for preventing displacement of a cargo container received in a cargo hold of a transport vehicle or vessel. The mechanism includes an elongate stop member having a base end portion and a distal end portion. The base end portion of the elongate stop member is pivotably mounted on the transport vehicle such that the distal end portion thereof is rotatable between a retracted position wherein the distal end portion does not substantially extend into the cargo hold and an extended position wherein the distal end portion extends into the cargo hold adjacent the cargo container, thereby preventing the cargo container from shifting or moving past the member. Means are provided for releasably locking the elongate member in the retracted position and means are provided for releasably maintaining the stop member in the extended position.

In accordance with the preferred embodiment of the invention, the stop mechanism includes an external bracket which is mounted on an exterior side-wall of the transport vehicle. The base end of the elongate member is mounted to the exterior bracket. In this embodiment, the vehicle side wall has an opening therein sized to fully accommodate the elongate member so that when the elongate member is maintained in the retracted position, it is stored external of the vehicle cargo hold.

In the preferred embodiment, a latch mechanism is also mounted on the exterior bracket thereby being accessible from the exterior of the vehicle cargo hold. The latch mechanism functions to releasably capture and retain the distal end portion of the elongate stop member in the retracted position.

Further in accordance with the preferred embodiment, the means for releasably maintaining the elongate stop member in the extended position includes the floor of the vehicle which is disposed generally transverse of the vehicle side wall. The base end of the elongate stop member is positioned adjacent the vehicle sidewall such that when the elongate member is released from the retracted position the distal end of the member is seatable against or within the floor. In addition, the floor has a hole or depression for receiving and retaining the distal end of the elongate member which is thereby braced at both ends thereof.

According to another aspect of the invention, a rail car is provided having the foregoing stop mechanism. In the preferred embodiment thereof, two of the preferred stop mechanisms are installed in opposed relation at approximately the middle of the rail car. In this manner, the rail car can allow two short or 20' intermodal containers to be securely stored in a cargo hold or well, yet, because the elongate member is stored outside of the cargo hold, the same cargo hold can also be used to store a very long 50' container.

BRIEF DESCRIPTION OF THE DRAWINGS

The present invention may be better understood by considering the following detailed description taken in conjunction with the accompanying drawings in which:

FIG. 2 is a front view of the stop mechanism shown in FIG. 1;

FIG. 3 is a cross-sectional view of the stop mechanism illustrated in FIG. 1, the view being taken along lines III—III in FIG. 2;

FIG. 7 is an isolated perspective view of a preferred embodiment of a latch assembly, which is a component of the stop mechanism illustrated in FIG. 1;

FIG. 8 is a top view of the latch assembly shown in FIG. 7;

FIG. 9 is a cross-sectional view of the latch assembly shown in FIG. 7, the view being taken along lines IX—IX in FIG. 8.

DETAILED DESCRIPTION OF THE PREFERRED EMBODIMENT

Figure 1:
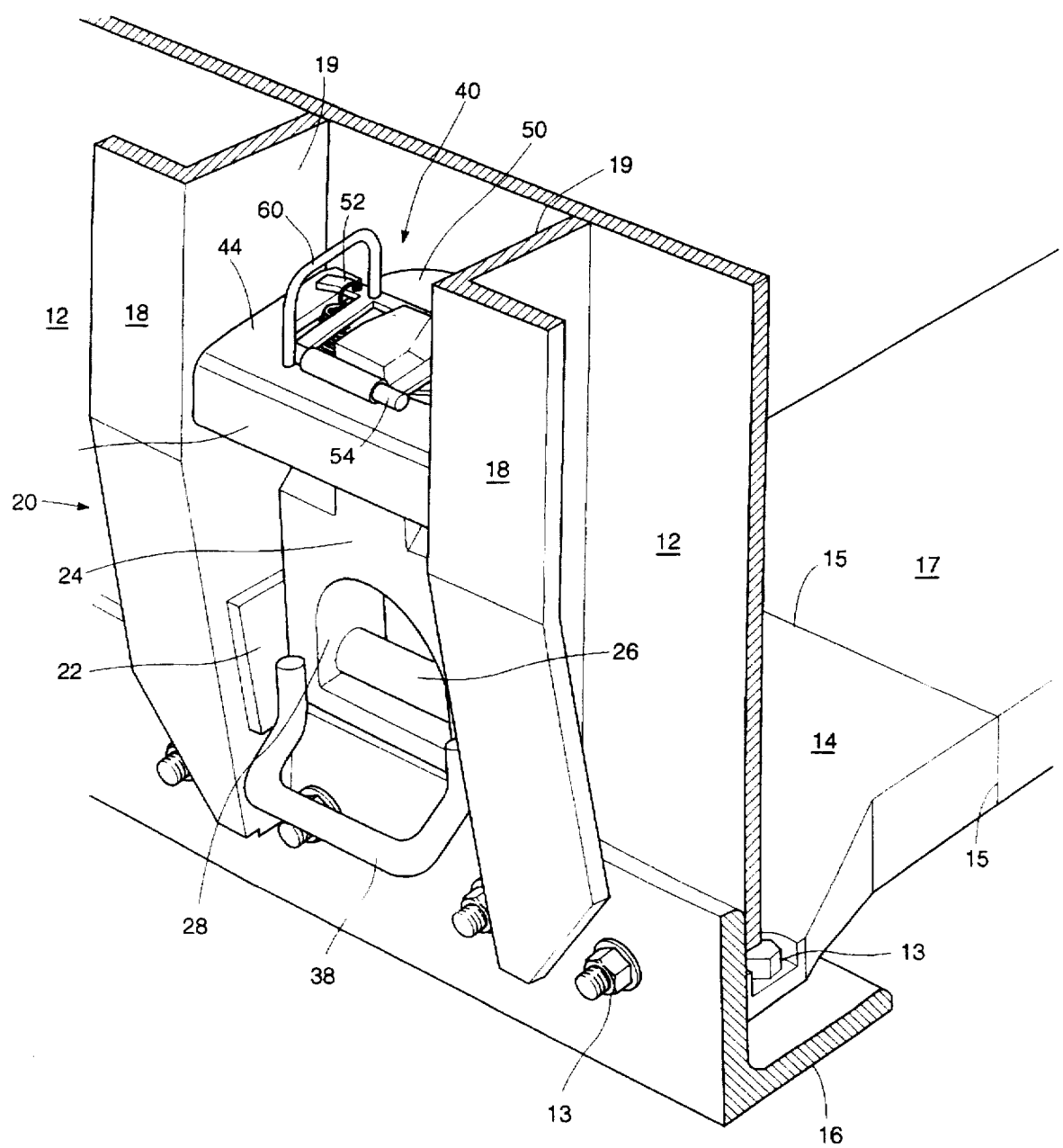
FIG. 1 is a perspective view of a stop mechanism in accordance with the preferred embodiment of the invention, the view being taken from above and showing the exterior of a portion of a rail car side wall.
Figure 10:
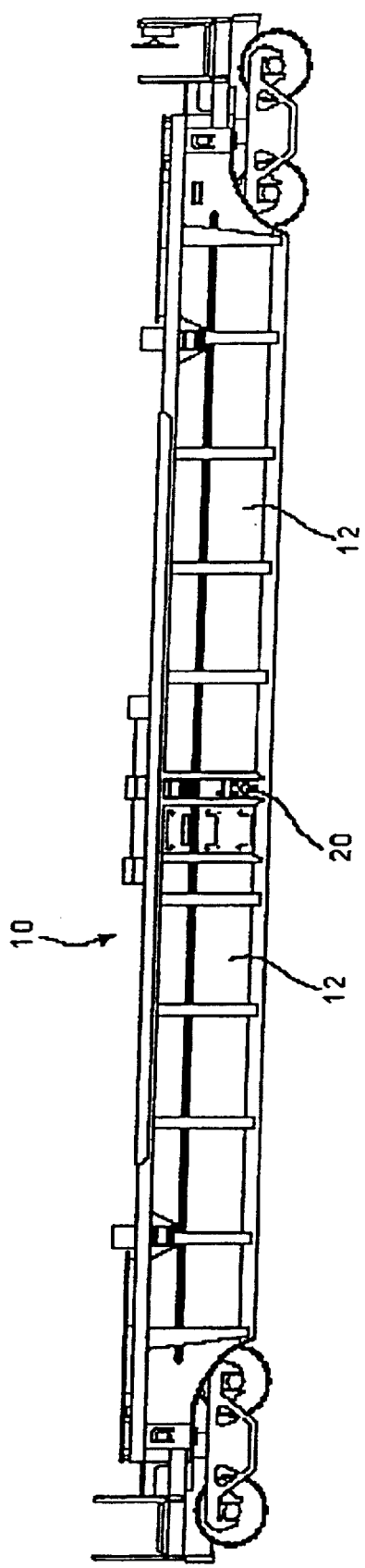
FIG. 10 is a side view of a railcar showing the location of the stop mechanism of FIG. 1 disposed in relation thereto.

FIGS. 1 and 10 show a stop mechanism 20 in accordance with the preferred embodiment mounted in a side wall 12 (shown in fragmentary view in FIG. 1) of a railcar 10 (seen in its entirety in FIG. 10). In the illustrated embodiment, the side wall 12 of railcar 10 is joined to a container floor support casting 14 thereof by fasteners such as bolts 13 which fasten the side wall 12 and floor support casting 14 to an L-shaped member 16 that serves to adjoin the wall and floor casting. The support casting 14 is welded at 15 to a floor cross member 17 that spans the width of the railcar and connects to a second floor support casting (not shown) present on the opposite side of the railcar. This particular construction of the railcar is not materially important to the invention for it can be employed with virtually any type of rail car as well as with a variety of other types of vehicles and/or vessels such as cars, trucks, freighters etc.

Referring particularly to FIGS. 1–3, a pair of aligned bracket members or braces 18, which together form a bracket, are attached to the exterior of the vehicle side wall 12 by conventional methods such as welding etc. Each bracket member 18 has a wall segment 19 disposed substantially normal to side wall 12. Hinge plates 22 and 23 (plate 23 is not shown in FIG. 1) are mounted by conventional means near the bottom of the wall segment 19. An elongate stop member 24 is pivotally mounted between bracket members 18 by a shaft 26 journalled therebetween. In the illustrated embodiment, the shaft 26 extends from hinge plate 22 through a first leg 28 and a second leg 30 of elongate stop member 24 and into hinge plate 23, thereby journalling the elongate member between the bracket members 18. As seen best in FIG. 2, in the preferred embodiment, the elongate member 24 can slide sideways for a short distance on the shaft 26.

Figure 4:
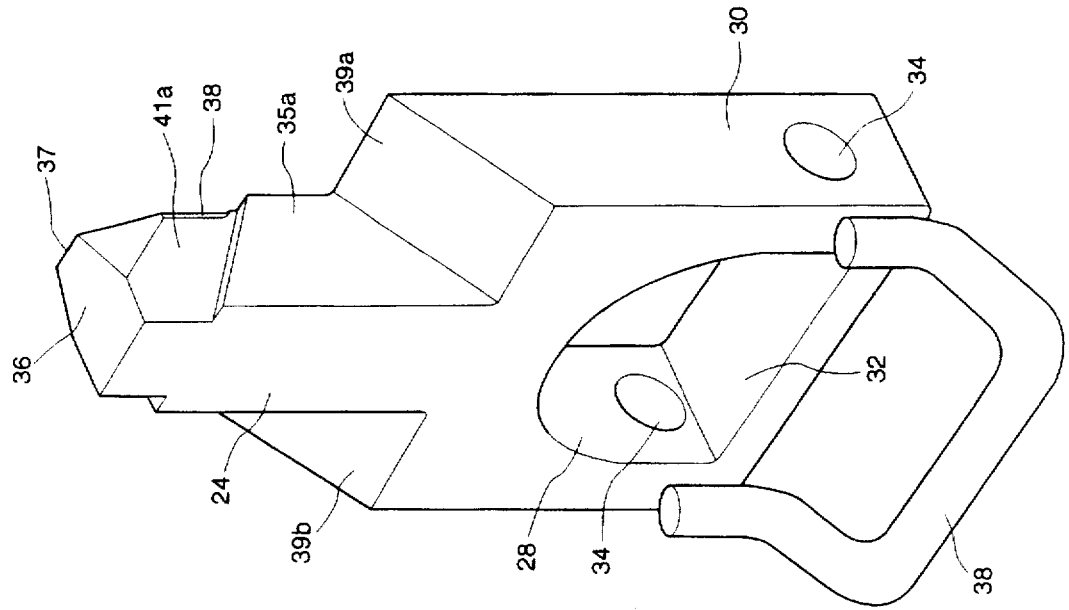
FIG. 4 is an isolated perspective view of a preferred embodiment of an elongate stop member, which is a component of the stop mechanism illustrated in FIG. 1.
Figure 5:
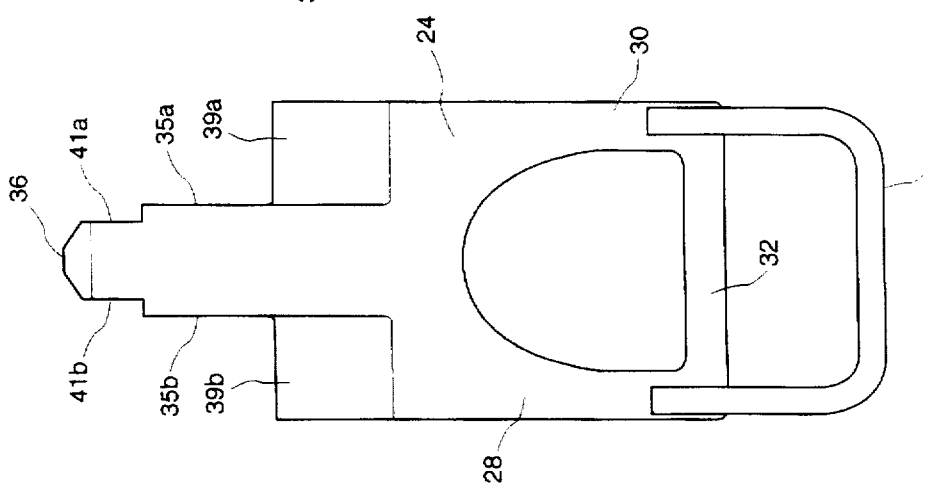
FIG. 5 is a side view of the stop member shown in FIG. 4.
Figure 6:
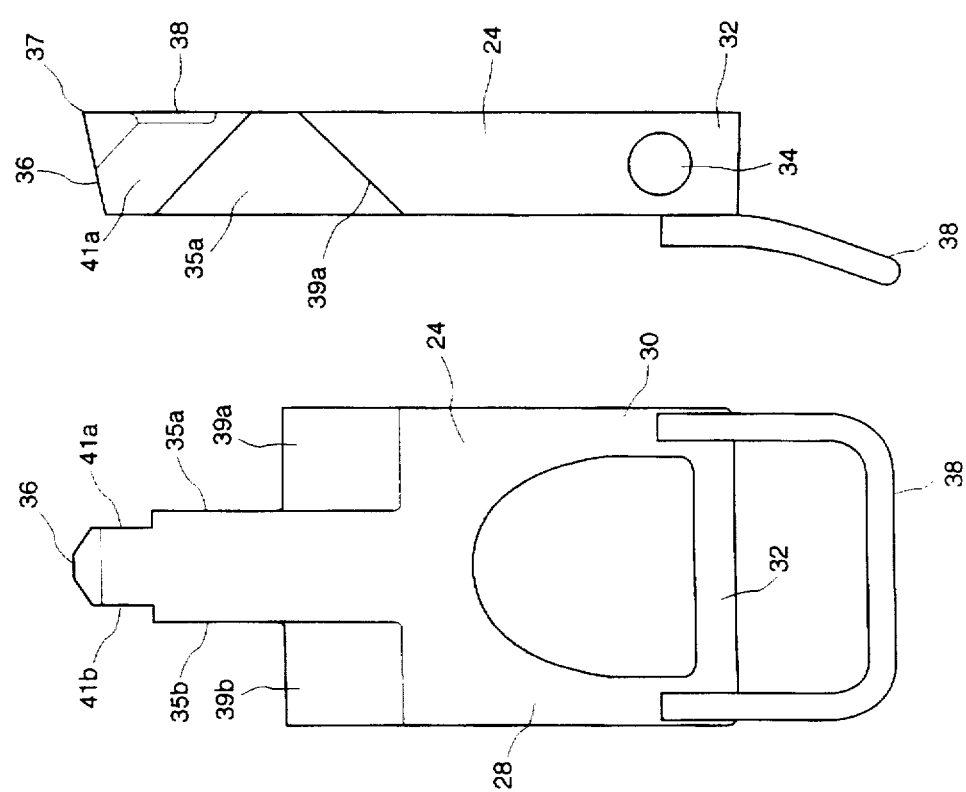
FIG. 6 is a front view of the stop member shown in FIG. 4.

The elongate stop member 24 is shown more clearly in isolated view in FIGS. 4, 5 and 6. Referring particularly to these figures, the elongate stop member 24 comprises a base 32 and bifurcated legs 28 and 30 which extend therefrom. Each of legs 28 and 30 includes axially aligned through-bores 34 which serve to seat the shaft 26. Suitable friction reducing means such as bearings (not shown) or grease may be disposed within the bores 34 to reduce friction between the walls of the bore and the portion of the shaft 26 communicating therewith. A handle or rung 38 is attached by conventional means to the base and legs of the elongate stop member 24 to enable an operator of the stop mechanism 20 to step on or easily grasp and actuate the elongate stop member 24, as described in greater detail below. For ease of reference, the base end of stop member 24, including the portion thereof wherein the shaft 26 is journalled, will be referred to as the "base end portion" of member 24. The opposite end of the elongate stop member 24 will hereinafter be termed the "distal end portion" of member 24.

The distal end portion of member 24 includes a sloped or ramped end face 36, the purpose of which will be described in greater detail below. This distal end portion of member 24 also includes an indentation 38 and engagement surfaces 41a and 41b for engagement with the floor support casting 14, as described in greater detail below. The elongate member 24 additionally includes ramped or sloped surfaces 39a and 39b adjacent to respective side surfaces 35a and 35b. The combination of surfaces 35a and 39a (or 35b and 39b) form a corner for abutting the corner or corner casting of an intermodal container or other type of large container, as described in greater detail below.

Referring particularly to FIGS. 1, 7, 8 and 9, the stop mechanism 20 includes a locking means such as latch assembly 40 which serves to releasably retain the elongate member 24 in an upright, non-actuated position, alternatively referred to as the "retracted position". The latch assembly 40 includes a cradle member 42 which is preferably composed of a relatively flat portion or seat 44 and a depending portion or under-hang 46 which is orientated generally perpendicular to the seat 44. The seat 44 also includes an evacuated space or cutout 48 which bifurcates the seat into arms 44A and 44B.

The cradle 42 is disposed between the wall segments 19 of bracket members 18 such that the ends of the seat arms 44A and 44B abut the vehicle side wall 12. The cutout 48 of the cradle faces and is adjacent an opening 50 present in the vehicle side wall 12 to enable the elongate support arm 24 to swing through the vehicle side wall 12 and into the cradle 42. Thus, the elongate member 24 is stored outside of the cargo hold.

A latch 52 is disposed transverse of the entrance to the cradle cutout 48. Means are provided for biasing the latch 52 against the cradle member. Such means include struts 52A and 52B which extend from the latch 52 and are rigidly connected to a pin 54. The pin 54 is rotatably housed within a sleeve 56 that is rigidly mounted to the seat 44. Springs 57 and 58 connect the latch 52 to the under-hang 46 of the cradle 42 thereby biasing the latch against the cradle. A handle 60 is mounted to the seat 44 so as to enable an operator to release the latch 52 from its biased position, it being apparent that the latch 52 can rotate about an axis defined by the pin 54.

Referring particularly to FIG. 3, the vehicle container support casting 14 includes a hole, hollow or depression 62 which is sized to receive the distal end portion of the elongate stop member 24 so that the elongate member engagement surfaces 41a or 41b can abut a sidewall of the hole or depression 62. The upper end of the walls of the depression 62 are also bevelled or angled (at 64) to matingly receive the indentations 38 of the elongate member 24.

The operation of the stop mechanism 20 can be best understood by particular reference to FIGS. 1–3. Initially, the distal end of the elongate member 24 is retained in 20 the cradle 42. In this position, the elongate member 24 is stored exterior of the vehicle cargo hold, which in the preferred embodiment is a well. It will be appreciated that the elongate member 24 cannot move from this retracted position because one side of the elongate member 24 abuts against the immovable cradle seat 44 and the opposite side of the elongate member 24 abuts the latch 52. The sloped end face 36 of the elongate member provides a peak 37 which is vertically higher than the vertical position of the cross-member 52 thereby preventing the elongate member 24 from sliding underneath the latch 52. On the other hand, the opposite end of end face 36 has a vertical position which is lower than the vertical position of the latch 52 so that the end face 36 can urge or shunt the latch 52 away from its biased position when the distal end of the elongate member is being directed into the cradle 42.

To release the elongate member 24 from the retracted position, the latch handle 60 is lifted upward by an operator thereby releasing the latch 52 from its biased position. At this point, the elongate member 24 is free to rotate out of the cradle 42 and into the actuated or extended position (the extended position is illustrated in FIG. 3 by a phantom elongate member 24'). A simple push of the elongate member 24 is sufficient to urge it to rotate about shaft 26 and fall into the extended position.

In the extended position, the elongate member side surface 35b (or 35a) abuts an intermodal container or other type of large container (shown in phantom in FIG. 3 by reference numeral 43). In the preferred embodiment, the distal end of the elongate member 24 is retained in the hole or depression 62 present in the vehicle floor support casting 14. The indentation 38 of the elongate member matingly engages with the angled edge 64 of the floor support casting 14. Because the elongate member 24 can slide sideways a short distance, as described above, one of the elongate member engagement surfaces 41b (or 41a) will abut a sidewall of the hole or depression 62 thereby bracing the distal end portion of the elongate member.

It will also be seen that, in the extended position, sloped elongate member surfaces 39a and 39b are vertically orientated thereby enabling the corner combination of elongate member surfaces 35b and 39b (or 35a and 39a, depending on where the container 43 is positioned) to form a corner which abuts the corner or corner casting of container 43. In this, manner, the stop mechanism 20, either in conjunction with an opposed vehicle side wall or another, opposed stop mechanism 20, can laterally, as well as longitudinally, seat the container in the cargo hold or well.

During transit, lateral and longitudinal forces acting upon the container 43 will be transferred to the elongate member 24 which in turn will transfer these forces to the vehicle sidewall 12 and, in the preferred embodiment, to the floor support casting 14. Where substantive forces are expected, the vehicle sidewall 12 and floor support casting 14 should be sufficiently sturdy to withstand such forces. Moreover, the elongate member 24 should be sufficiently sturdy and the area of contact between the elongate member engagement surfaces 41a or 41b and the sidewall of the hole or depression 62 should be sufficiently large to prevent the elongate member from crushing under strong longitudinal forces.

Once the elongate stop member 24 is actuated to be in the extended position, the stop member 24 effectively compartmentalizes the railcar well so that no container having a width approaching the width of the railcar well can shift, move or otherwise be displaced past the elongate stop member 24 due to inertial or dynamic forces encountered during transit.

To return the elongate stop member to the parallel position, an operator need simply step on or otherwise force rung 38 downward thereby directing the distal end of the elongate member into the cradle 42, as described above, whereby the elongate member is locked in the retracted position.

A number of variations can be made to the preferred embodiment. For example, the elongate member can be mounted in the interior of the vehicle, or the base end of the elongate member can literally be mounted in the vehicle side wall as opposed to being mounted on any exterior or interior brackets. Depending on the forces encountered during transit and the shear strength of the vehicle sidewall, it may also not be necessarily to incorporate a hole or depression in the vehicle floor to accommodate the distal end of the elongate stop member. Thus, one means for maintaining the elongate member in the extracted position is simply the floor of the vehicle. Other variations to such means are also contemplated by the invention, including the use of an articulated arm (not shown) or limited motion hinge (not shown) which can be attached between the vehicle wall and the elongate member to prevent the elongate member from falling to the floor yet maintain it so that it extends perpendicular of the vehicle side wall.

The forgoing description has been made with reference to the preferred embodiment of the invention. However, it is possible to make other embodiments that employ the principles of the invention and that fall within its spirit and scope as defined by the following claims.

What is claimed is:

1. An apparatus for preventing displacement of a cargo container received in a cargo hold of a transport vehicle or vessel, the apparatus comprising, in combination with said vehicle a vessel and said cargo hold:

an elongate stop member having a base end portion and a distal end portion, the base end portion being pivotably mounted on the transport vehicle or vessel for movement of the distal end portion between a retracted position, wherein the distal end portion does not extend into the cargo hold, and an extended position, wherein the distal end portion extends into the cargo hold adjacent the cargo container to thereby prevent longitudinal displacement of the cargo container past the distal end portion;

a latch assembly for releasably retaining the elongate member in the retracted position, the latch assembly comprising:

(a) a cradle member for receiving the distal end portion of the elongate stop member, the cradle member having an entrance disposed adjacent the cargo hold;

(b) a latch disposed transverse of the cradle entrance, and (c) means for biasing the latch against the cradle member;

wherein said distal end portion of the elongate member is shaped for urging aside the biased latch when the elongate member is directed into the cradle member from its extended position, and wherein the latch is returned to its biased position against the cradle member by said biasing means when the elongate member is fully disposed therewithin in its retracted position.

2. Apparatus according to claim 1 including a bracket mounted to a side wall of said transport vehicle or vessel, the base end portion of the elongate stop member and the latch assembly being mounted on the bracket, and wherein said vehicle or vessel side wall includes an opening sized to fully accommodate the elongate stop member so that when the elongate member is locked in the retracted position, it is stored externally of the cargo hold.

3. Apparatus according to claim 2 including a handle connected to the elongate member.

4. Apparatus according to claim 2 further including means for releasably maintaining the elongate stop member in the extended position, wherein the extended position maintaining means includes a bottom wall of the vehicle or vessel being disposed generally normal to and gravitationally lower than the portion of the vehicle or vessel side wall to which the bracket attached to the elongate stop member is mounted, the distal end portion of the elongate stop member being seatable against the bottom wall of the vehicle or vessel when the elongate stop member is released from the retracted position.

5. Apparatus according to claim 4 wherein said extended position maintaining means comprises a hole or depression in the bottom wall for receiving the distal end portion of the elongate member.

6. Apparatus according to claim 1, further comprising means for releasably maintaining the elongate stop member in the extended position.

7. Apparatus according to claim 6 wherein said latch includes a handle for releasing the latch from its biased position.

8. Apparatus according to claim 7 wherein the elongate stop member is shaped to laterally seat the container in the cargo hold.

9. An apparatus for preventing displacement of a cargo container when said cargo container is received in a cargo hold of a transport vehicle or vessel, the apparatus comprising:

an elongate stop member having a base end portion and a distal end portion, the elongate stop member being adapted for pivotable mounting adjacent the base end portion thereof onto the transport vehicle or vessel for rotatable movement of the distal end portion between a retracted position, wherein the distal end portion does not extend into said cargo hold when said elongate stop member is mounted as aforesaid, and an extended position, wherein the distal end portion extends into said cargo hold to thereby prevent longitudinal displacement of the cargo container past the distal end portion when said elongate stop member is mounted as aforesaid;

locking means for releasably retaining the elongate stop member in the retracted position, the locking means being adapted for mounting onto the transport vehicle or vessel, the locking means when mounted as aforesaid being moveable between a lock position, wherein the elongate member is prevented from rotatable movement to its extended position and a release position, wherein the elongate stop member is enabled for rotatable movement to its extended position, the locking means being biased to said lock position; and wherein the distal end portion of the elongate member is shaped for urging the locking means away from the lock position when the elongate member is brought from its extended position to its retracted position, the locking means being returned to the lock position by said bias when the elongate member has achieved its retracted position.

10. The apparatus according to claim 9, wherein the locking means includes a cross member adapted to be pivotably mounted to the transport vehicle or vessel, said cross member being oriented in a direction transverse to the elongate stop member when said cross member is mounted as aforesaid.

11. Apparatus according to claim 10, wherein said locking means further comprises a cradle member for receiving the distal end portion of the elongate stop member in the retracted position, the cradle member being adapted for mounting onto the transport vehicle or vessel, the cradle member having an entrance disposed adjacent the cargo hold when said cradle member is mounted as aforesaid, said cross member being disposed transverse of the cradle entrance;

means for biasing the cross member against the cradle member to cause said bias of said locking means to said lock position;

wherein the distal end portion of the elongate member is shaped for urging aside the biased cross member when the elongate member is directed into the cradle member from its extended position, and wherein the cross member is returned to its biased position against the cradle member when the elongate member is fully disposed therewithin its retracted position.

12. A rail car having an apparatus for preventing displacement of a cargo container when said cargo container is received in a cargo hold of said rail car, the apparatus comprising:

an elongate stop member having a base end portion and a distal end portion, the elongate stop member being pivotally mounted adjacent the base end portion thereof onto said rail car for rotatable movement of the distal end portion between a retracted position, wherein the distal end portion does not extend into said cargo hold, and an extended position, wherein the distal end portion extends into said cargo hold to thereby prevent longitudinal displacement of the cargo container past the distal end portion;

locking means for releasably retaining the elongate stop member in the retracted position, the locking means being mounted onto the rail car, the locking means being moveable between a lock position, wherein the elongate member is prevented from rotatable movement to its extended position and a release position, wherein the elongate stop member is enabled for rotatable movement to its extended position, the locking means being biased to said lock position; and wherein the distal end portion of the elongate member is shaped for urging the locking means away from the lock position when the elongate member is brought from its extended position to its retracted position, the locking means being returned to the lock position by said bias when the elongate member has achieved its retracted position.

13. A rail car according to claim 12, wherein a second of said apparatus for preventing displacement of a cargo container is provided, each said apparatus for preventing displacement being mounted in said rail car in opposed relation to one another on opposite sides of the rail car.

14. The rail car according to claim 13 wherein the elongate member of each said apparatus for preventing displacement is shaped to laterally seat the container in the cargo hold.

* * * * *